April 12, 1960    E. J. DILLMAN    2,932,453
THERMOSTATIC SHOWER VALVE
Filed Nov. 28, 1956
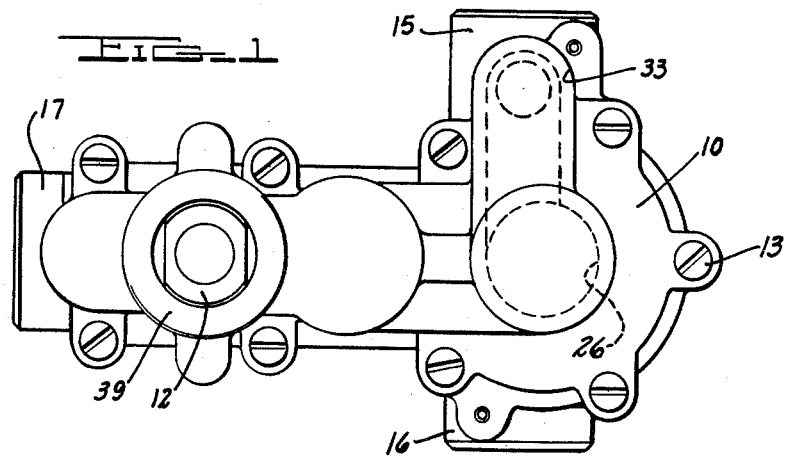
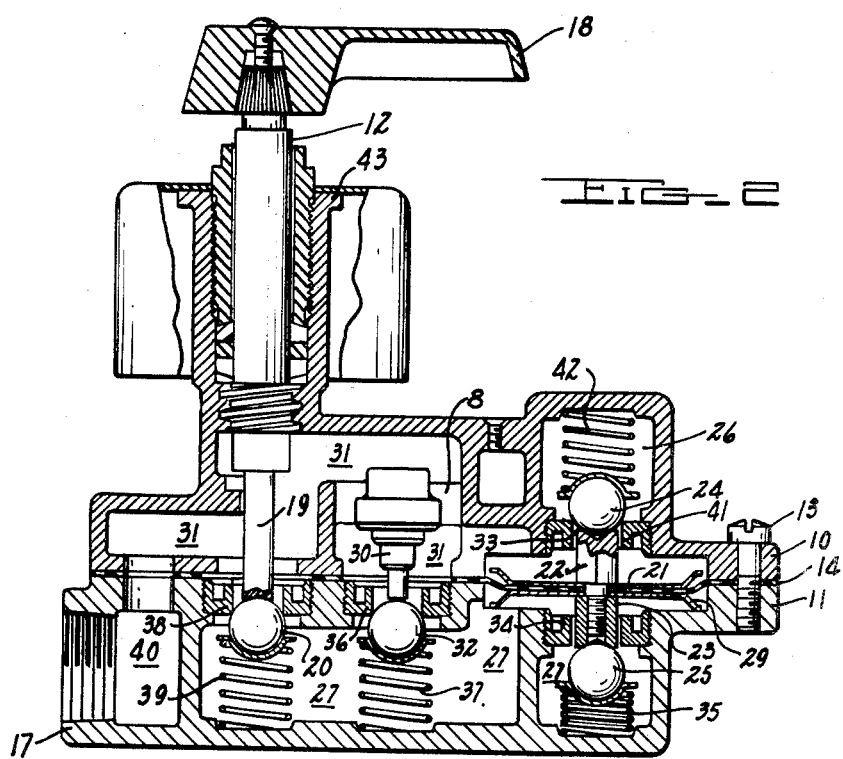
INVENTOR.
EARNEST J. DILLMAN
BY
SMITH, OLSEN, LEWIS & McRAE
ATTORNEYS United States Patent Office
2,932,453
Patented Apr. 12, 1960

2,932,453
THERMOSTATIC SHOWER VALVE

Earnest J. Dillman, Detroit, Mich., assignor, by mesne assignments, to American Radiator & Standard Sanitary Corporation, New York, N.Y., a corporation of Delaware Application November 28, 1956, Serial No. 624,854

5 Claims. (Cl. 236—12)

This invention relates to an improved fluid mixing valve. More particularly, the invention has to do with an improved valve for mixing relatively hot and cold fluids which are subject to changes in temperature and pressure, whereby the mixed fluid obtained can be maintained at a substantially uniform preselected temperature.

It is an object of this invention to provide a mixing valve that can continuously mix hot and cold fluids to obtain automatically or thermostatically a mixed fluid of a substantially constant maximum temperature.

It is a further object to provide a mixing valve of the foregoing character which in addition to having maximum temperature control means also has a device for accommodating temporary surges or depletions in either the hot or cold fluid caused by temporary changes in the relative pressure of the two fluids.

It is a further object of this invention to provide a mixing valve of the foregoing character wherein the mixed fluid can be further cooled to a selected temperature below the maximum mixed fluid temperature by an externally operated valve member.

It is a still further object of this invention to provide a valve which has substantially no sliding parts and thus its internal parts are not subject to sticking and leaking which otherwise might occur from scaling or the depositing of impurities on such internal parts.

Still further, it is an object of this invention to provide a fluid mixing valve which produces an improved overall mixed fluid temperature regulation while maintaining the pressure drop across such valve at a minimum.

It is still another object of this invention to provide a compact mixing valve housing which can be economically molded or fabricated.

Another object is to provide a mixing valve which is relatively easy to assemble or disassemble for replacement, cleaning or repair of internal parts.

Other objects of this invention will appear in the following description and appended claims, reference being had to the accompanying drawings forming a part of this specification wherein like reference characters designate corresponding parts in the several views.

Fig. 1 is a top view illustrating a partially assembled mixing device embodying the present invention.

Fig. 2 is a front cross sectional assembled view of the mixing device in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The assembled valve has two main interacting housing sections 10 and 11 facing each other and joined together at their interface, the top section 10 having an externally adjustable control means shown as externally adjustable valve fitting 12 therein and being secured to the bottom section 11 by nine bolts 13 extending through an interface gasket 14. The bottom section 11 contains the hot fluid inlet 15, the cold fluid inlet 16 and the mixed fluid outlet 17 which extend substantially in a common plane out beyond the outer rim of the top housing section 10. The hot fluid inlet 15 and the cold fluid inlet 16 are axially aligned.

Although it is contemplated having the hot fluid inlet 15 in the top housing section 10, it is preferred to have both inlets 15 and 16 and the outlet 17 all in the same housing section. In so doing the mixing valve can be more readily repaired internally. Thus, in the embodiment of Figs. 1 and 2, the top section 10 may be removed from its bottom section 11 without detaching any of the piping (not shown) coupled with the inlets 15 and 16 or the outlet 17, merely by removing the nine bolts 13. In this manner any of the internal parts of either the top section 10 or the bottom section 11 can be reached readily for replacement, cleaning or repair. Further, when the mixing valve is being used to mix hot and cold water, as in a shower unit, having all three connections in the lower housing section 11 permits more ready installation as well as ease of repair, for the connections can be hidden from outside view and yet the valve can still be repaired from the outside. Also, with the connections in a common plane, a minimum amount of space will be required for the water piping.

In Fig. 2 the externally adjustable valve fitting 12 in the top housing section 10 is shown as a manually adjustable screw plunger-type valve activator in which when the handle 18 is turned, the plunger 19 is caused to activate ball valve 20, as will be more fully explained herein below.

Positioned in the interface between the two housing sections is a floating diaphragm 21. Rods 22 and 23 connected to opposite sides of the floating diaphragm 21 operate two diametrically opposed ball valves 24 and 25 respectively which in turn are respectively positioned in a chamber 26 in the top housing section 10 for hot fluid and in a chamber 27 in the bottom housing section 11 for cold fluid. As will be more fully explained hereinafter, this floating diaphragm 21 is sensitive to changes in the relative pressure between the hot fluid and the cold fluid and rapidly compensates for relatively rapid changes therebetween in order to obtain a more uniformly regulated mixed fluid temperature at the outlet 17. The floating diaphragm assembly 21 comprises a flexible gasket member 14, the flexing portion of which is reinforced on either side by means of two outwardly facing shallow pan-like members 28 and 29. The flexible gasket member 14 and the reinforcing members 28 and 29 are secured to each other by means of a threaded male portion of rod 22 extending through the three members and joining with a female threaded portion of rod 23. In this manner of assembly, the length of the rods 22 and 23 can be readily adjusted, as well. The square cross-sectional shape of the rods 22 and 23 is preferred over a circular shape for the reason that it is easier to grip the rods when they are being screwed or unscrewed. Furthermore, ample clearance is provided between the rods and the passages through which they extend so as to avoid sticking of parts, or the like.

The gasket member 14 may be of any suitable flexible fluid resistant material. As shown in Fig. 2, it may extend over the entire interface between the two housing sections as the sealing means therefor. Or the gasket member 14 may extend around the periphery of the opening in each section which is adapted to receive the diaphragm assembly 21; in which case a second gasket would be used to seal the remaining portion of the interface between the two housing sections 10 and 11. In either case the flexible portion of the barrier forms a partially movable barrier between the two fluids to be mixed and is adapted to oscillate in response to changes in the relative pressure between the fluid on opposite sides of the diaphragm so that the rod members 22 and 23 will open or close their respective valves and thereby control the relative flow of fluid past either side of the barrier.

A thermostatic power element 30 is positioned on a spider-like wall 8 in a chamber 31 of the top housing section 10 for mixing hot and cold fluid. The piston end of such thermostat 30 extends through the interface and in accordance with the predetermined maximum outlet temperature of mixed fluid, the thermostatic device operates a ball valve 32 positioned in the cold fluid chamber 27 of the bottom housing section 11 and thereby controls the flow of cold fluid through the ball valve 32 into the mixed fluid chamber 31. The power element 30 is preferably of a type wherein a temperature sensitive deformable medium (not shown) is carried within the casing of the power element 30 and acts against a deformable member (not shown) to extend the piston end of the power element 30. The internal construction of such a power device may be seen more fully in U.S. Patent 2,636,886. The functioning of this thermostatic power element 30 is more fully described hereinafter.

Also operating through the interface is the manual control means shown as the externally adjustable valve fitting 12, the piston or plunger 19 of which extends therethrough and in accordance with a desired minimum outlet temperature of the mixed fluid, the plunger may be manually or mechanically adjusted or screwed to operate the ball valve 20 positioned also in the cold fluid chamber 27 and thereby to control the flow of cold fluid through ball valve 20 into the mixed fluid chamber 31.

In addition to the hot fluid inlet 15 in the bottom casing 11 there is a hot fluid chamber, not shown in detail in the drawings, for receiving the incoming hot fluid. This chamber is open at the interface of the two housing sections and is in communication with the hot fluid chamber 26 through the conduit 33.

The cold fluid chamber 27 in the bottom casing 11 is for receiving the incoming cold fluid from the inlet 16, and has three openings at the interface between the two housing sections, each of which is adapted to receive a ball valve seat. One opening and ball valve seat 34 is in communication with and adapted to receive the rod 23 connected to the floating diaphragm 21. Seated on the valve seat 34 in the cold fluid chamber 27 by a resilient means, shown as a spring 35, is the ball valve 25 in direct contact with its activating rod 23. Another opening and ball valve seat 36 in the cold fluid chamber 27 is in communication with and adapted to receive the piston end of the thermostatic power element 30 extending through the interface between the two sections. Seated on the valve seat 36 in the cold fluid chamber 27 by a resilient means, shown as a spring 37, is the ball valve 32 in direct contact with its activating thermostatic piston rod 30. The third opening and ball valve seat 38 is in communication with and adapted to receive the end of plunger 19 extending through the interface between the two sections. Seated on the ball valve seat 38 by a resilient means, shown as a spring 39, is the ball valve 20 in direct contact with its activating externally adjustable plunger 19.

Partitioned from the cold fluid chamber 27 is the mixed fluid outlet 17 and mixed fluid chamber 40 therefor. This chamber 40 is open at the interface of the two housing sections and is in direct communication with the mixing chamber 31 of the upper housing section 10.

In the top section 10, the hot fluid chamber 26 for receiving the incoming hot fluid from the inlet 15 and conduit 33 has an internal opening (not shown) in communication with the conduit 33 leading to the bottom section 11. In essence, then, the hot fluid chamber in the lower housing section 11 (not shown), the conduit 33 and the hot fluid chamber 26 in the upper housing section 10 combine to form a single chamber means for receiving the hot fluid from the inlet 15. At the interface the hot fluid chamber 26 has an opening and ball valve seat 41 which is in communication with and adapted to receive the rod 22 connected to the floating diaphragm 21. Seated on valve seat 41 by a resilient means, shown as spring 42, is the ball valve 24 in direct contact with its activating rod 22. The opening and valve seat 41 in the top section 10 are positioned to be directly opposite the opening and valve seat 34 in the bottom section 11, thus, when functioning, the floating diaphragm 21 forms a partially movable barrier therebetween which physically separates the cold fluid in the bottom section 11 from the hot fluid in the top section 10.

The mixing chamber 31 is partially partitioned from the hot fluid chamber 26 and has three openings at the interface between the two sections. One opening is in communication with and directly opposite the opening and valve seat 36 in the cold fluid chamber 27. The temperature sensitive or activating thermostatic piston 30 extends through this opening across the interface into direct contact with the ball valve 30 in the cold fluid chamber 27. Another opening is in communication with and directly opposite the opening and valve seat 38 in the cold fluid chamber 27. Extending through this opening across the interface into direct contact with the ball valve 20 in the cold fluid chamber 27 is the piston or plunger end 19 of the externally adjustable valve fitting 12. The third opening is in communication with and directly opposite the mixed fluid chamber 40.

The upper housing section 10 also has an opening 43 in its outer casing i.e. not at the interface, adapted to receive the adjustable valve fitting 12. This opening 43 is aligned with the opening in the interface to allow the plunger 19 of the adjustable valve fitting 12 to extend through it and across the interface into direct contact with the ball valve 20 in the cold fluid chamber 27.

When using the mixing valve of this invention, the hot and cold fluid inlets 15 and 16 would be coupled with hot and cold fluid conduits respectively, and the mixed fluid outlet 17 normally would be coupled with a shutoff valve for controlling the volume of fluid flow therethrough. Where the valve is used as a water shower valve it may be desirable to have the inlets and outlet all in the same plane of the bottom section 11. Further, when adapted for such use, the inlets may also have shutoff valves coupled with them to further control the flow.

In the operation of the floating diaphragm 21 it is preferred to have the resilient means 42 normally pressing against its valve 24 with a somewhat greater force than the force of resilient means 35 against its valve 25, one reason being that if the cold water supply to inlet 16 is inadvertently or otherwise cut off the valve will not send scalding hot water out through outlet 17 in a manner to cause personal injury, it being appreciated that the valve has application as a mixing valve for a shower or similar fluid distributing mechanism.

When the outlet 17 is open allowing fluid to flow through the mixing valve and when the streams of hot and cold fluids are being delivered to their respective inlets 15 and 16 at substantially steady pressures, the force differential between springs 35 and 42 tends to bias diaphragm 21 in the direction of the cold fluid chamber 26. This in turn causes rod 23 to move the ball valve 25 in the cold fluid chamber 27 off its seat 34. Cold fluid is then permitted to flow out of the cold fluid chamber 27 through the valve opening into chamber 27. Movement of ball valve 25 away from seat 34 will be accompanied by a corresponding movement of ball valve 24 toward its seat 41 so as to throttle hot fluid flow through conduit 33 in such manner as to reduce the hot fluid pressure in chamber 31. The force differential between springs 35 and 41 causes the pressures in chamber 31 to be somewhat less than the pressure in chamber 27, the pressure in chamber 31 for example being ten pounds and the pressure in chamber 27 being seventeen pounds. This pressure differential enables cold fluid from chamber 27 to flow into chamber 31 when the fluid temperature in chamber 31 becomes so excessive as to energize power element 30 in a manner to open ball valve 32. Without the pressure differential there could be no substantial passage of cold fluid from chamber 27 into chamber 31 when ball valve 32 was opened.

The invention provides a rapid externally adjustable means 12 for selecting a mixed fluid temperature below the predetermined maximum temperature automatically maintained by the thermostatic device 30. Thus, in the valve embodied in Fig. 2, by turning the manually adjustable handle 18, valve fitting 12 is activated and causes its plunger 19 to push the ball valve 20 off its seat 38. In so doing, more cold fluid in the cold fluid chamber 27 will flow through the additional valve opening into the mixing chamber 31 to further cool the hot fluid and make it possible to obtain a mixed fluid having a minimum temperature which is below the maximum temperature set by the thermostatic piston and above the incoming cold fluid temperature.

As previously indicated the quantity of mixed fluid issuing from outlet 17 may be controlled by a valve downstream from outlet 17. The quantity of mixed fluid could also be controlled by valves in the upstream lines leading to inlets 15 and 16. Whatever method is used to control the quantity of mixed fluid, the pressure drops across the conduits in elements 34 and 41 tend to be large at high mixed fluid quantities and small at low mixed fluid quantities. Thus at throttling pressures the fluid flow from outlet 17 approaches zero. Under such a "throttling pressure" conditions the force differential between springs 35 and 42 assumes a relatively high ratio with reference to the fluid pressures, i.e. the springs tend to assume a greater control over the position of valves 24 and 25 than the fluid pressures. As a result the cold valve 25 tends to remain further open per any given "temperature condition" of handle 18 than when the valve is operating at higher flow conditions, and the mixed fluid temperature per any temperature setting of handle 18 tends to be colder at low flow conditions than at high flow conditions. In order to correct this undesired temperature variation the present invention proposes to utilize a spring 42 which has a relatively stiff spring scale, i.e. a spring which has relatively low force in its expanded condition and relatively high force in its contracted condition. Preferably the spring force differential approaches zero at zero hot fluid flow and seven pounds at maximum hot fluid flow.

This variation in spring force differential (i.e. a higher spring force differential at high fluid flows and a lower spring force differential at low fluid flows) tends to minimize the temperature errors caused by variation in the "fluid flow-spring force" ratio which takes place over the range of fluid flows. The net effect is to insure that the mixed fluid temperatures at high fluid flows are the same as those at low fluid flows per any given temperature setting of handle 18.

It is contemplated that valve 25 could be positioned against member 23 by other means than spring 35 and that the strength of spring 42 could be suitably modified to obtain the desired "variable pressure" operating force on elements 24 and 25, i.e. a single spring could be utilized in place of the two springs 35 and 42.

The invention claimed is:

1. A hot fluid-cold fluid mixing valve comprising first and second housing sections joined to form an interface therebetween; wall means in said first housing section forming a hot inlet chamber, mixing chamber and first port therebetween; wall means in said second housing section forming a cold inlet chamber, cold receiver chamber, and second port therebetween; a diaphragm in the interface and between said ports; first and second port- closing elements for respective ones of said ports, and means connecting said elements with the diaphragm whereby to inversely vary the relative flows through said ports in accordance with the position of the diaphragm; two openings formed in the second mentioned wall means putting the cold receiver chamber in communication with the mixing chamber; annular elements removably positioned in said openings forming third and fourth ports; third and fourth port-closing elements positioned in the cold receiver chamber for controlling fluid flow through the third and fourth ports; spring means urging the third and fourth port-closing elements toward positions closing their ports; a thermostatic power element positioned in the mixing chamber and removably abutting the third port-closing element for opening it against the action of its spring means; and a manually actuable thrust element mounted on the first housing section and removably abutting the fourth port-closing element for opening it against the action of its spring means.

2. The combination of claim 1 wherein the port-closing elements are ball valves.

3. The combination of claim 1 and further comprising a first conduit section for connecting the hot inlet chamber with a hot fluid line; a second conduit section for connecting the cold inlet chamber with a cold fluid line; and a third conduit section for connecting the mixing chamber with a mixed fluid line; each of said conduit sections being formed integrally with the second housing section to permit removal of the first housing section without interference with the fluid lines.

4. A hot-fluid-cold fluid mixing valve comprising first and second housing sections joined to form an interface therebetween; wall means in said first housing section forming a hot inlet chamber, mixing chamber and first port therebetween; wall means in said second housing section forming a cold inlet chamber, cold receiver chamber, and second port therebetween; a diaphragm in the interface and between said ports; first and second port-closing elements for respective ones of said ports, and means connecting said elements with the diaphragm whereby to inversely vary the relative flows through said ports in accordance with the position of the diaphragm; an opening formed in the second mentioned wall means putting the cold receiver chamber in communication with the mixing chamber; an annular element removably positioned in said opening forming a third port; a third port-closing element positioned in the cold receiver chamber for controlling fluid flow through the third port; spring means urging the third port-closing element toward a position closing its port; and a thermostatic power element positioned in the mixing chamber and removably abutting the third port-closing element for opening it against the action of its spring means.

5. The combination of claim 4 and further comprising variable force spring means acting to urge the first port-closing element toward a closed position and the second port-closing element toward an open position; said last mentioned spring means being calibrated to have a comparatively great operating force when the first port is open and a comparatively small operating force when the first port is closed.

References Cited in the file of this patent

UNITED STATES PATENTS

| 1,927,054 | Williams | Sept. 19, 1933 |
|---|---|---|
| 1,942,270 | Resek | Jan. 2, 1934 |
| 1,989,909 | Boydston | Feb. 5, 1935 |
| 2,145,114 | Gibbs et al. | Jan. 24, 1939 |
| 2,296,266 | Breckenridge | Sept. 22, 1942 |
| 2,319,418 | Lund | May 18, 1943 |
| 2,526,099 | Vinson | Oct. 17, 1950 |
| 2,532,896 | Dillman | Dec. 5, 1950 |
| 2,566,019 | Dempsey | Aug. 28, 1951 |
| 2,714,488 | Wangenheim | Aug. 2, 1955 |